(12) United States Patent
Yang et al.

(10) Patent No.: US 8,289,459 B2
(45) Date of Patent: Oct. 16, 2012

(54) TRANSFLECTIVE LIQUID CRYSTAL DISPLAY PANEL AND LIQUID CRYSTAL DISPLAY PANEL MODULE

(75) Inventors: Chang-Hao Yang, Tainan (TW); Yung Shun Yang, Tainan (TW); Chung Kuang Wei, Tainan (TW)

(73) Assignee: Chimei Innolux Corporation, Miao-Li County (TW)

( * ) Notice: Subject to any disclaimer, the term of this patent is extended or adjusted under 35 U.S.C. 154(b) by 1237 days.

(21) Appl. No.: 12/012,342

(22) Filed: Feb. 1, 2008

(65) Prior Publication Data
US 2008/0225189 A1    Sep. 18, 2008

(30) Foreign Application Priority Data

Mar. 14, 2007 (TW) .............................. 96108823 A (51) Int. Cl.
*G02F 1/1335* (2006.01)
(52) U.S. Cl. ............... 349/37; 349/36; 345/103; 345/92
(58) Field of Classification Search ........................ None
See application file for complete search history.

(56) References Cited

U.S. PATENT DOCUMENTS

| 7,173,600 | B2 | 2/2007 | Kodate et al. ................. 345/103 |
| 2002/0070905 | A1 | 6/2002 | Kodate et al. |
| 2003/0169223 | A1* | 9/2003 | Lee et al. ........................ 345/92 |
| 2003/0184695 | A1 | 10/2003 | Chen et al. |
| 2004/0004607 | A1 | 1/2004 | Kodate et al. |

FOREIGN PATENT DOCUMENTS

| JP | 2002196357 A | 7/2002 |
| JP | 2003295159 A | 10/2003 |
| JP | 2004037675 A | 2/2004 |

OTHER PUBLICATIONS

Chinese Patent Office, Office Action for corresponding Chinese Application No. 200710096820.5, dated Aug. 10, 2010, 5 pgs.
Japanese Patent Office, Office Action mailed Aug. 14, 2012, in Japanese application No. 2008-057349.

* cited by examiner

*Primary Examiner* — Thanh-Nhan P Nguyen
(74) *Attorney, Agent, or Firm* — Trop, Pruner & Hu, P.C.

(57) ABSTRACT

In accordance with one embodiment of the present invention, a first pixel of an LCD panel is driven via a first scan line to a first pixel voltage during a first scan period and to a second pixel voltage during a second scan period. Also, a second pixel is driven via the first scan line and a second scan line to the first pixel voltage during the first scan period.

13 Claims, 11 Drawing Sheets

TRANSFLECTIVE LIQUID CRYSTAL DISPLAY PANEL AND LIQUID CRYSTAL DISPLAY PANEL MODULE

CROSS-REFERENCE TO RELATED APPLICATION

Pursuant to 35 U.S.C. §119, this application claims priority to Taiwan Application Serial No. 96108823, filed Mar. 14, 2007, the subject matter of which is incorporated herein by reference.

BACKGROUND

The invention relates in general to a liquid crystal display (LCD) panel, and more particularly to a transflective LCD panel.

One type of conventional transflective liquid crystal display (LCD) has a dual liquid crystal cell gap. The manufacturing processes for an LCD with a dual liquid crystal cell gap are complicated and the process variations can be hard to control. In contrast, another type of conventional transflective LCD having a single cell gap may have process variations that may be more easily controlled as compared to a transflective LCD having a dual liquid crystal cell gap.

In a transflective LCD having a single liquid crystal cell gap, the length of the optical path of the reflective pixel may be twice that of the optical path of the transmissive pixel. If the reflective pixel and the transmissive pixel are to display the same luminance simultaneously, the effective refractivity of the liquid crystal molecule of the reflective pixel is conventionally one half of the effective refractivity of the liquid crystal molecule of the transmissive pixel. Thus, in a transflective LCD having a single liquid crystal cell gap, the transmissive pixel and the reflective pixel are conventionally driven according to two independent voltage-transmittance curves (V-T curves), respectively.

Accordingly, the transmissive pixel and the reflective pixel may have to be individually driven by two transistors to display the same luminance in the same pixel unit in a transflective LCD having a single liquid crystal cell gap. Consequently, the number of data lines or scan lines, the number of data drivers or scan drivers, the pixel voltages output from the data drivers or scan drivers, and the frequency of the scan signal may have to be correspondingly increased. As a result, the area and the complexity of the driving circuit are greatly increased.

Figure 1A:
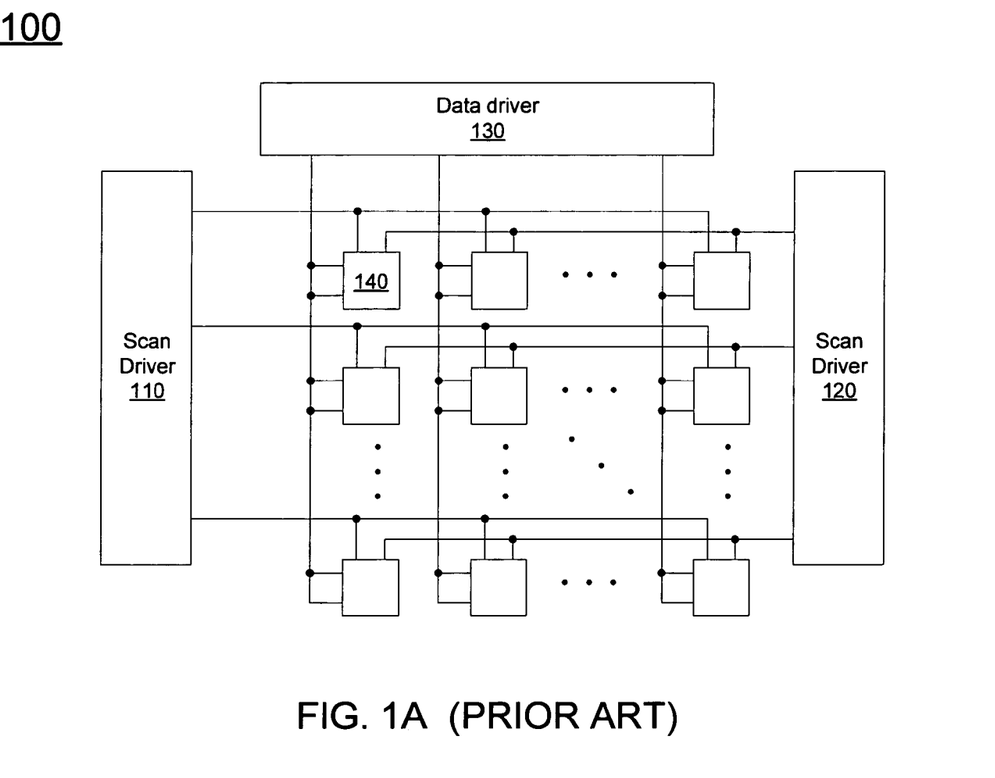
FIG. 1A (Prior Art) is a block diagram showing a pixel driving circuit of a conventional transflective LCD.
Figure 1B:
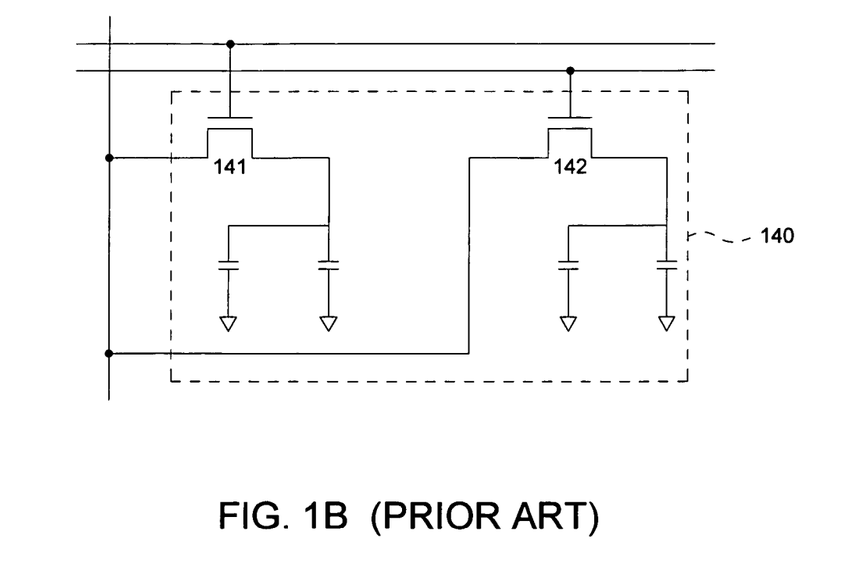
FIG. 1B (Prior Art) shows a detailed circuit of a pixel unit of the transflective LCD of FIG. 1A.

FIG. 1A (Prior Art) is a block diagram showing a pixel driving circuit of conventional transflective LCD 100. Referring to FIG. 1A, transflective LCD 100 includes two scan drivers 110 and 120, data driver 130 and several pixel units. Each pixel unit includes a transmissive pixel and a reflective pixel. FIG. 1B (Prior Art) shows a detailed circuit of pixel unit 140 of transflective LCD 100 of FIG. 1A. Referring to FIG. 1B, pixel unit 140 includes a transmissive pixel and a reflective pixel, which are respectively driven by transistors 141 and 142. Transistors 141 and 142 of pixel unit 140 receive scan signals transmitted from scan drivers 110 and 120 via two scan lines, and a pixel voltage transmitted from data driver 130 through one data line. Data driver 130 outputs the respective different pixel voltages to transistors 141 and 142 at different respective times. As mentioned above, each pixel unit in transflective LCD 100 has two transistors for respectively driving the transmissive pixel and the reflective pixel. Each pixel unit needs two scan drivers and two scan lines to provide two scan signals. Consequently, the circuit complexity of the pixel driving circuit is increased.

Figure 2A:
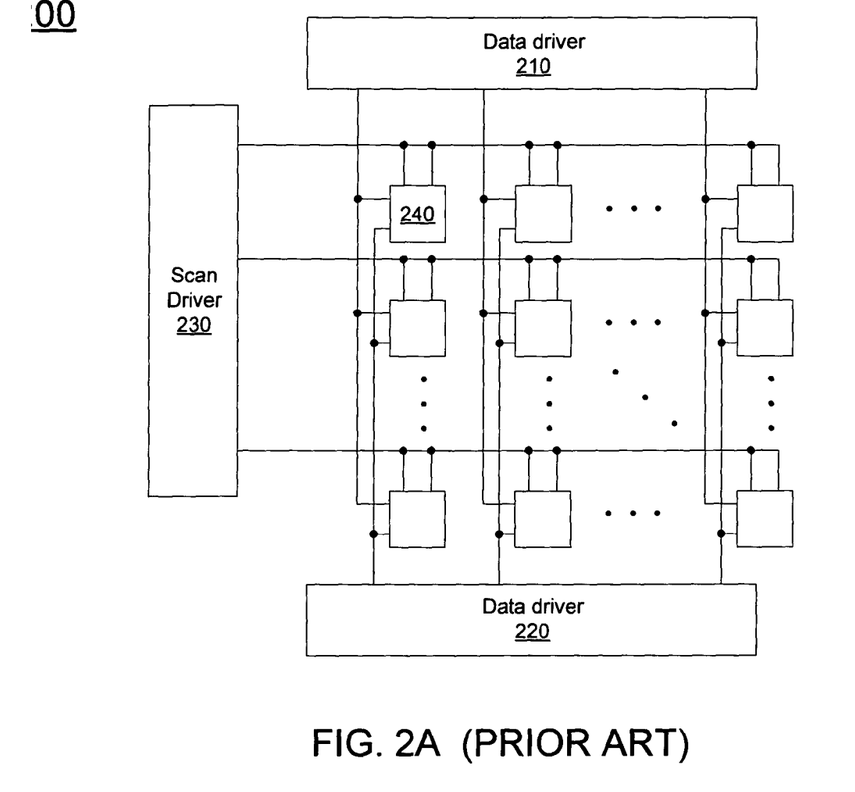
FIG. 2A (Prior Art) is a block diagram showing a pixel driving circuit of another conventional transflective LCD.
Figure 2B:
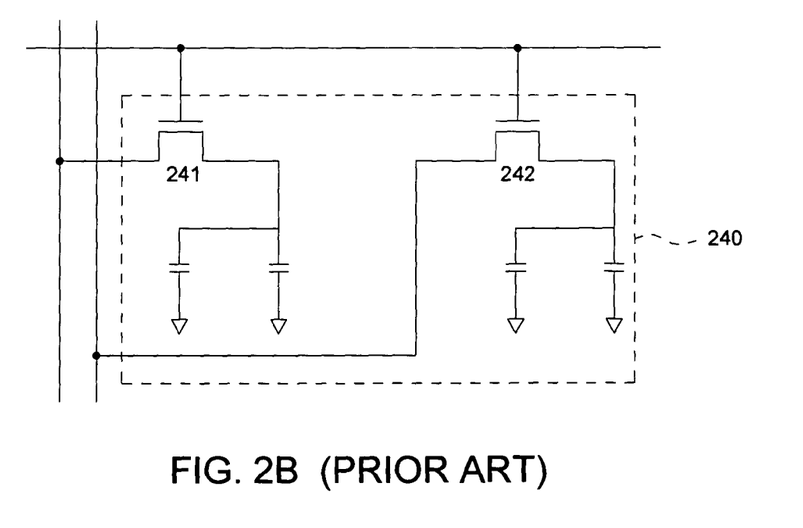
FIG. 2B (Prior Art) shows a detailed circuit of a pixel unit of the transflective LCD of FIG. 2A.

FIG. 2A (Prior Art) is a block diagram showing a pixel driving circuit of another conventional transflective LCD 200. Referring to FIG. 2A, transflective LCD 200 includes two data drivers 210 and 220, scan driver 230 and several pixel units. Similar to the pixel units of FIG. 1A, each pixel unit in FIG. 2A includes a transmissive pixel and a reflective pixel. FIG. 2B (Prior Art) shows a detailed circuit of pixel unit 240 of transflective LCD 200 of FIG. 2A. Referring to FIG. 2B, pixel unit 240 includes a transmissive pixel and a reflective pixel. The transmissive pixel and the reflective pixel are respectively driven by transistors 241 and 242. Transistors 241 and 242 of pixel unit 240 each receive a scan signal transmitted from scan driver 230 via the same scan line, and pixel voltages transmitted from data drivers 210 and 220 via two respective data lines. As mentioned above, two transistors in each pixel unit of transflective LCD 200 need two data drivers and two data lines to provide two pixel voltages. Consequently, the circuit complexity of the pixel driving circuit is increased.

Figure 3A:
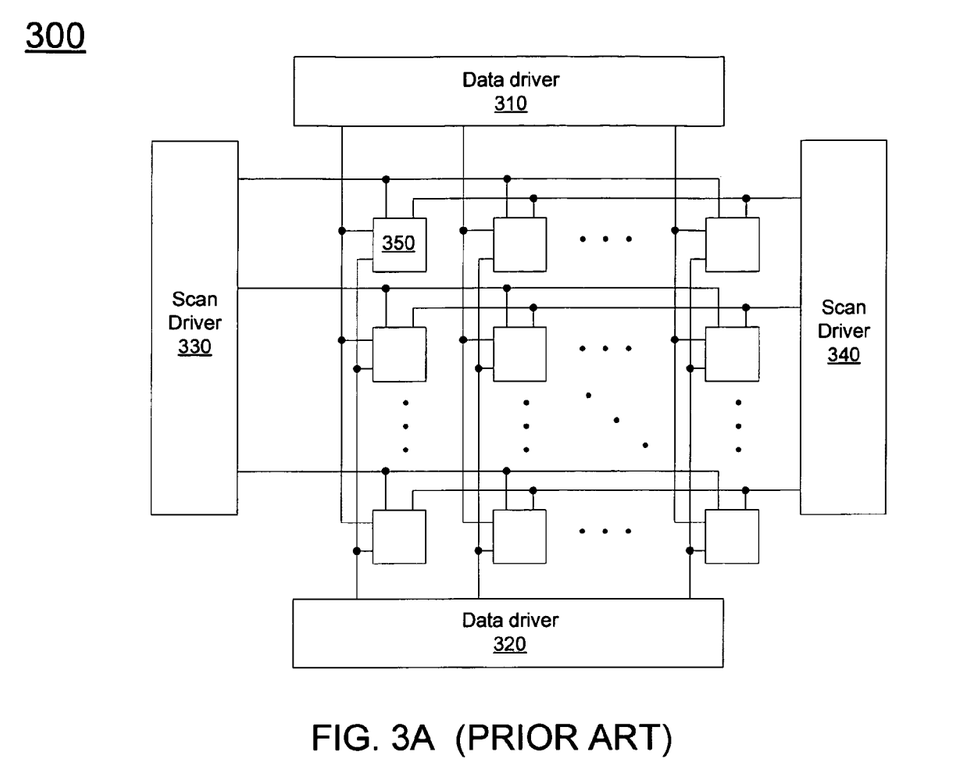
FIG. 3A (Prior Art) is a block diagram showing a pixel driving circuit of another conventional transflective LCD.
Figure 3B:
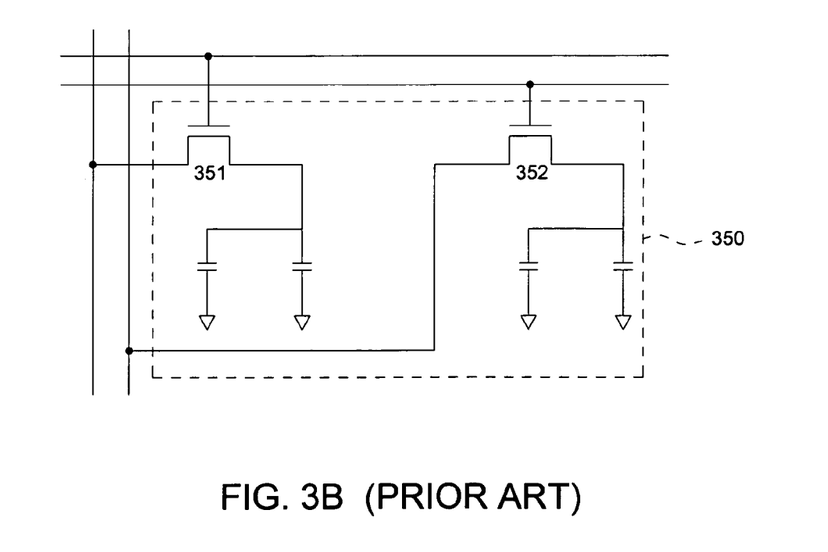
FIG. 3B (Prior Art) shows a detailed circuit of a pixel unit of the transflective LCD of FIG. 3A.

FIG. 3A (Prior Art) is a block diagram showing a pixel driving circuit of another conventional transflective LCD 300. Referring to FIG. 3A, transflective LCD 300 includes two data drivers 310 and 320, two scan drivers 330 and 340 and several pixel units. Similar to the pixel units of FIG. 1A, each pixel unit of FIG. 3A includes a transmissive pixel and a reflective pixel. FIG. 3B (Prior Art) shows a detailed circuit of a pixel unit 350 of the transflective LCD 300 of FIG. 3A. Referring to FIG. 3B, the pixel unit 350 includes a transmissive pixel and a reflective pixel. The transmissive pixel and the reflective pixel are respectively driven by transistors 351 and 352. Transistors 351 and 352 of the pixel unit 350 receive scan signals transmitted from scan drivers 330 and 340 via two respective scan lines, and pixel voltages transmitted from data drivers 310 and 320 via two respective data lines. As mentioned above, two transistors in each pixel unit of transflective LCD 300 need two data drivers and two data lines to provide two pixel voltages, and two scan drivers and two scan lines to provide two scan signals. Consequently, the circuit complexity of the pixel driving circuit is further increased.

Although a conventional transflective LCD having a single liquid crystal cell gap has process variations that may be more easily controlled as compared to a transflective LCD having a dual liquid crystal cell gap, two pixel voltages may have to be independently and respectively supplied to the transmissive pixel and the reflective pixel in each pixel unit. Consequently, as discussed above, each pixel unit needs two scan drivers and/or two data drivers to provide the scan signals and the pixel voltages, and two scan lines or two data lines to transmit the scan signals and the pixel voltages. Thus, the area and the complexity of the pixel driving circuit in the transflective LCD are greatly increased so that the aperture ratio of the LCD panel is decreased and the manufacturing cost is also greatly increased.

BRIEF DESCRIPTION OF THE DRAWINGS

The accompanying drawings, incorporated in and constituting a part of this specification, may illustrate one or more implementations consistent with the principles of the invention and, together with the description of the invention, explain such implementations. The drawings are not necessarily to scale, the emphasis instead being placed upon illustrating the principles of the invention.

DETAILED DESCRIPTION

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, and techniques, such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

Figure 4:
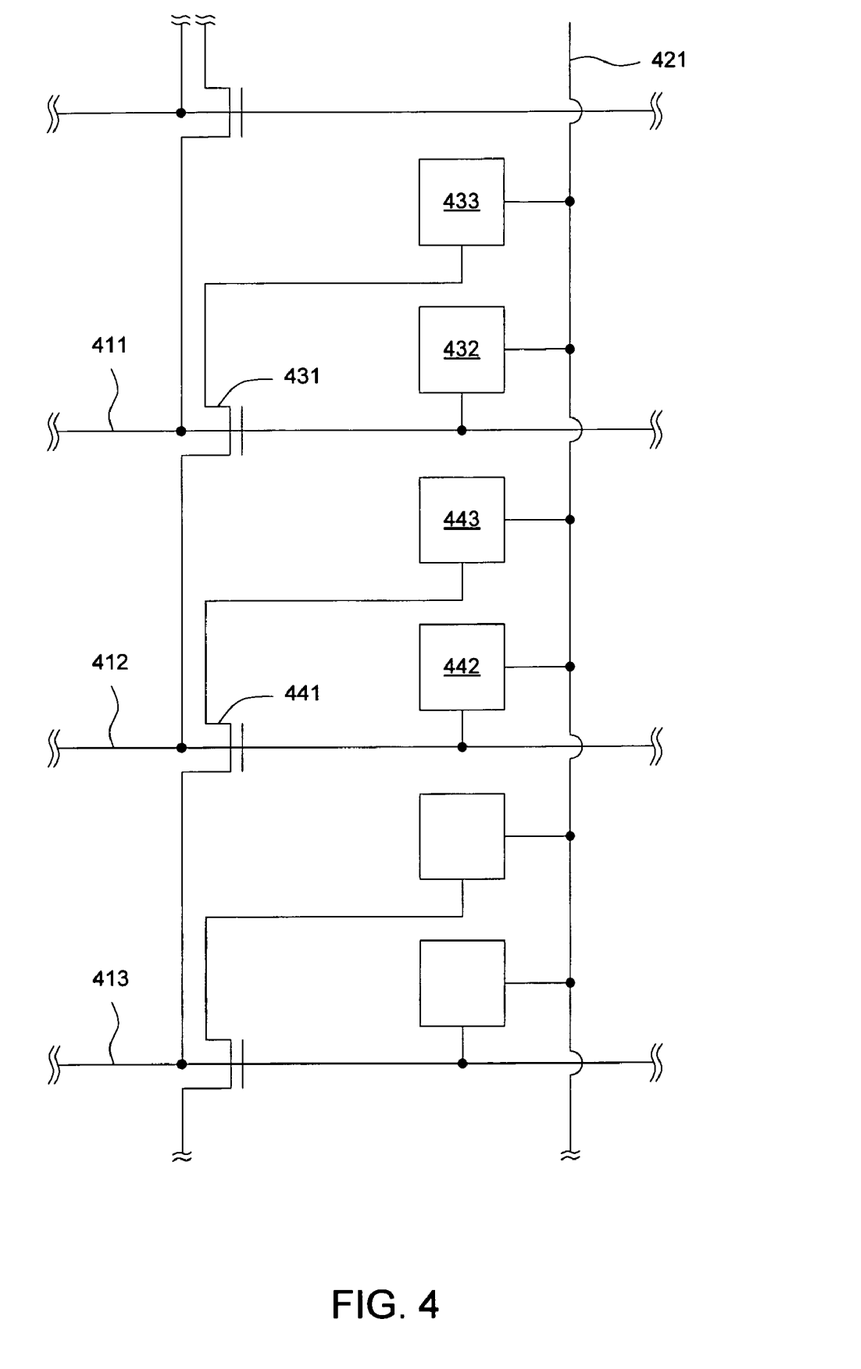
FIG. 4 is a schematic diagram of a portion of a pixel driving circuit of an LCD panel according to an embodiment of the invention.

FIG. 4 is a diagram showing a portion of a pixel driving circuit of an LCD panel according to an embodiment of the invention. Referring to FIG. 4, the LCD panel includes scan lines 411, 412 and 413, data line 421, pixels 432 and 433 (of a first pixel unit) and an associated transistor 431 and pixels 442 and 443 (of a second pixel unit) and an associated transistor 441. Note that an array of pixel units is provided, with each pixel unit having a corresponding pair of pixels. To drive pixels 432, 433 of the LCD panel according to an embodiment of the invention, pixels 432 and 433 respectively receive pixel voltage D2 and pixel voltage D1 transmitted from data line 421 respectively during scan period T1 and scan period T2. Scan line 411 and scan line 412 transmit the scan signals S1 and S2, respectively. Pixel 432 and transistor 431 may be controlled by scan signal S1. When transistor 431 is enabled, scan signal S2 is transmitted to pixel 433 via transistor 431 to control enabling of pixel 433.

During scan period T1, scan signal S1 is enabled such that pixel 432 and transistor 431 are enabled. Scan signal S2 can thus be transmitted to pixel 433 via transistor 431. During scan period T1, scan signal S2 is also enabled such that pixel 442 is enabled. After pixel 432 and pixel 433 are enabled, they can receive pixel voltage D1 transmitted from data line 421. Thus, both pixels 432 and 433 store pixel voltage D1 during scan period T1.

During scan period T2, scan signal S1 still enables pixel 432 and transistor 431. Similarly, scan signal S2 can thus be transmitted to pixel 433 via transistor 431. However, scan signal S2 changes to be disabled during scan period T2 so that pixel 433 is disabled in accordance with one embodiment of the present invention. Thus, pixel 432 is enabled during scan period T2 and can receive pixel voltage D2 transmitted from data line 421. Pixel 433, however, is disabled and cannot receive pixel voltage D2. Thus, pixel 432 stores pixel voltage D2 and pixel 433 stores pixel voltage D1 during scan period T2. Consequently, pixels 432 and 433 respectively store pixel voltages D2 and D1 respectively transmitted from data line 421 during scan periods T1 and T2 to display the corresponding luminance levels.

The pixel driving circuit of the LCD panel may be applied to a transflective LCD panel. In a transflective LCD panel, each pixel unit may have a transmissive pixel and a reflective pixel.

Figure 5:
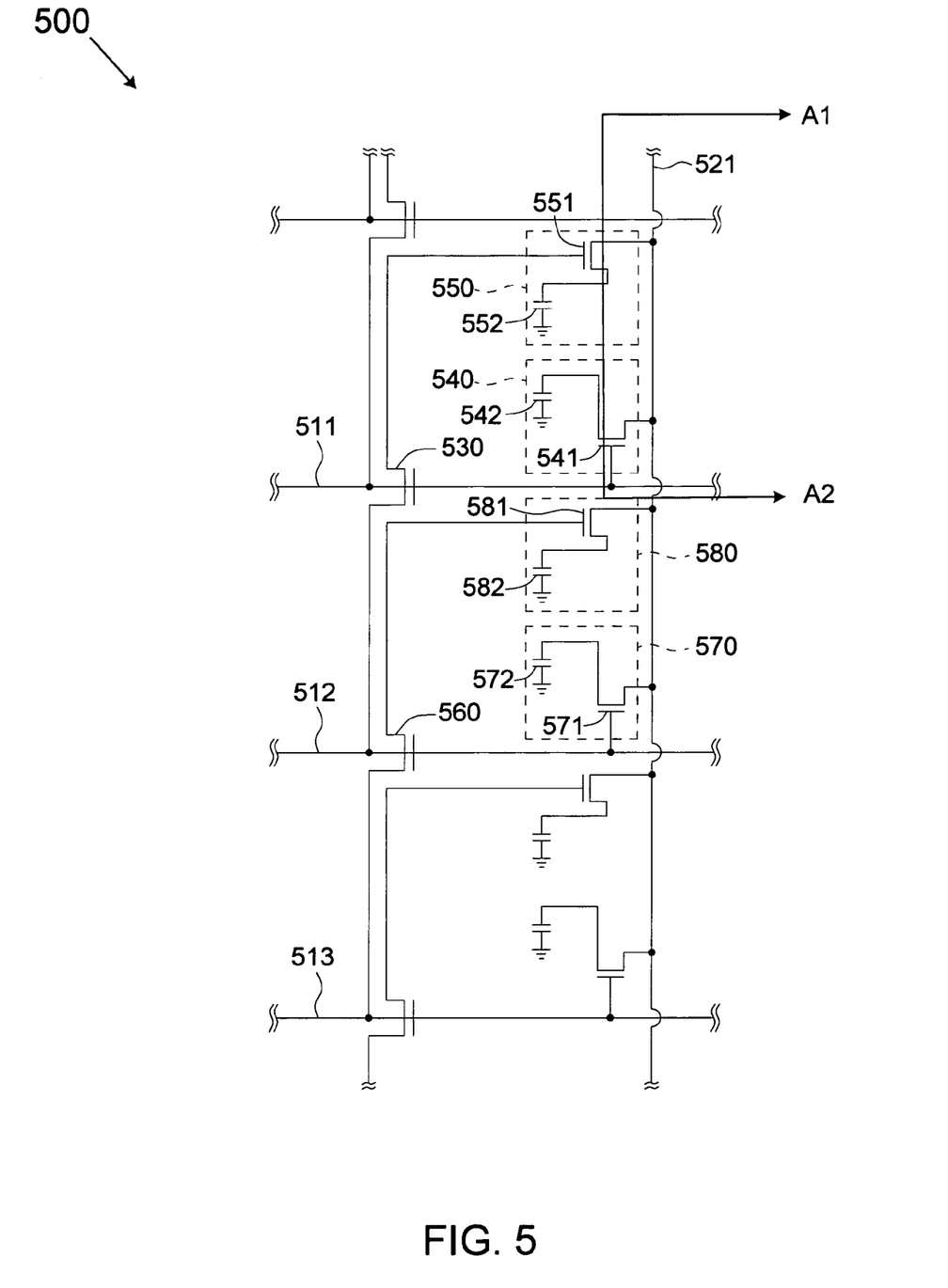
FIG. 5 is a schematic diagram of a portion of a pixel driving circuit of a transflective LCD panel according to an embodiment of the invention.
Figure 6A:
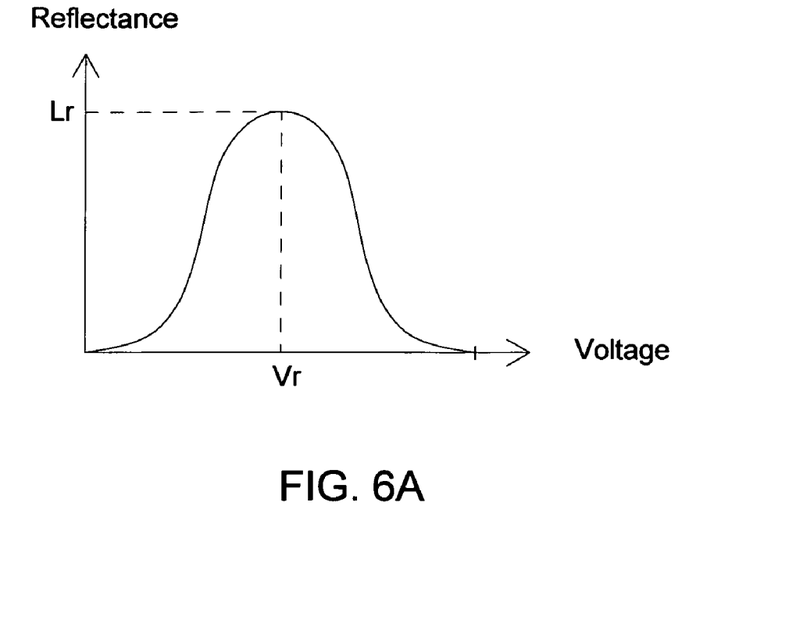
FIG. 6A is a graph of an example of a voltage-reflectance curve according to an embodiment of the invention.
Figure 6B:
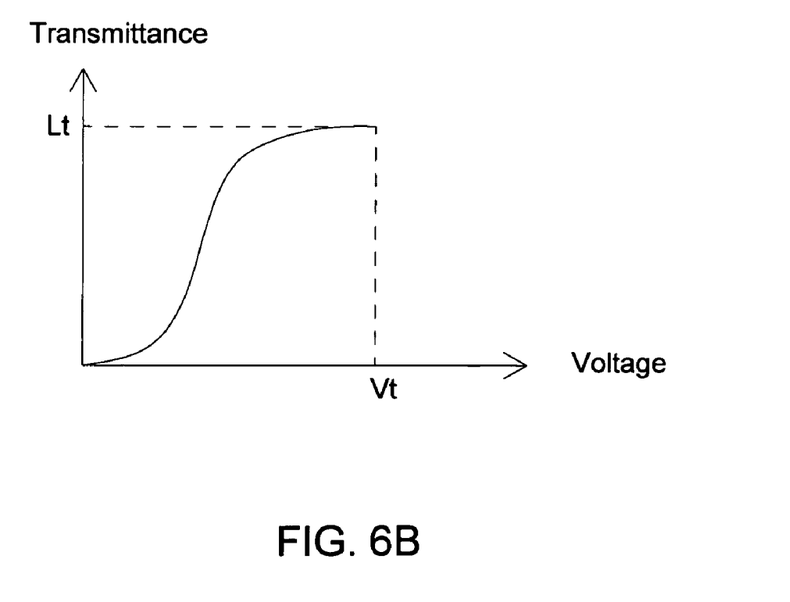
FIG. 6B is a graph of an example of a voltage-transmittance curve according to an embodiment of the invention.

FIG. 5 is a diagram showing a portion of a pixel driving circuit of a transflective LCD panel in accordance with one embodiment of the present invention. Pixel 540 includes transistor 541 and storage capacitor 542. Pixel 550 includes transistor 551 and storage capacitor 552. In this example, pixels 540 and 550 are respectively a transmissive pixel and a reflective pixel. Pixels 540 and 550 respectively receive pixel voltage DA2 and pixel voltage DA1 respectively transmitted from data line 521 during scan period T1 and scan period T2. Pixel voltages DA1 and DA2 are respectively the reflective pixel voltage and the transmissive pixel voltage output according to voltage-transmittance curves (V-T curves) and voltage-reflectance curves (V-R curves), such as the V-R curve of the reflective pixel of FIG. 6A and the V-T curve of the transmissive pixel of FIG. 6B. The display device in this example is normally in black mode in accordance with one embodiment of the present invention.

Scan lines 511, 512 and 513 respectively transmit scan signals S1, S2 and S3. Transistor 530 and transistor 541 of pixel 540 are controlled by scan signal S1. When transistor 530 turns on, scan signal S2 is transmitted to transistor 551 via transistor 530 to control transistor 551 of pixel 550 to turn on or not.

Figure 7:
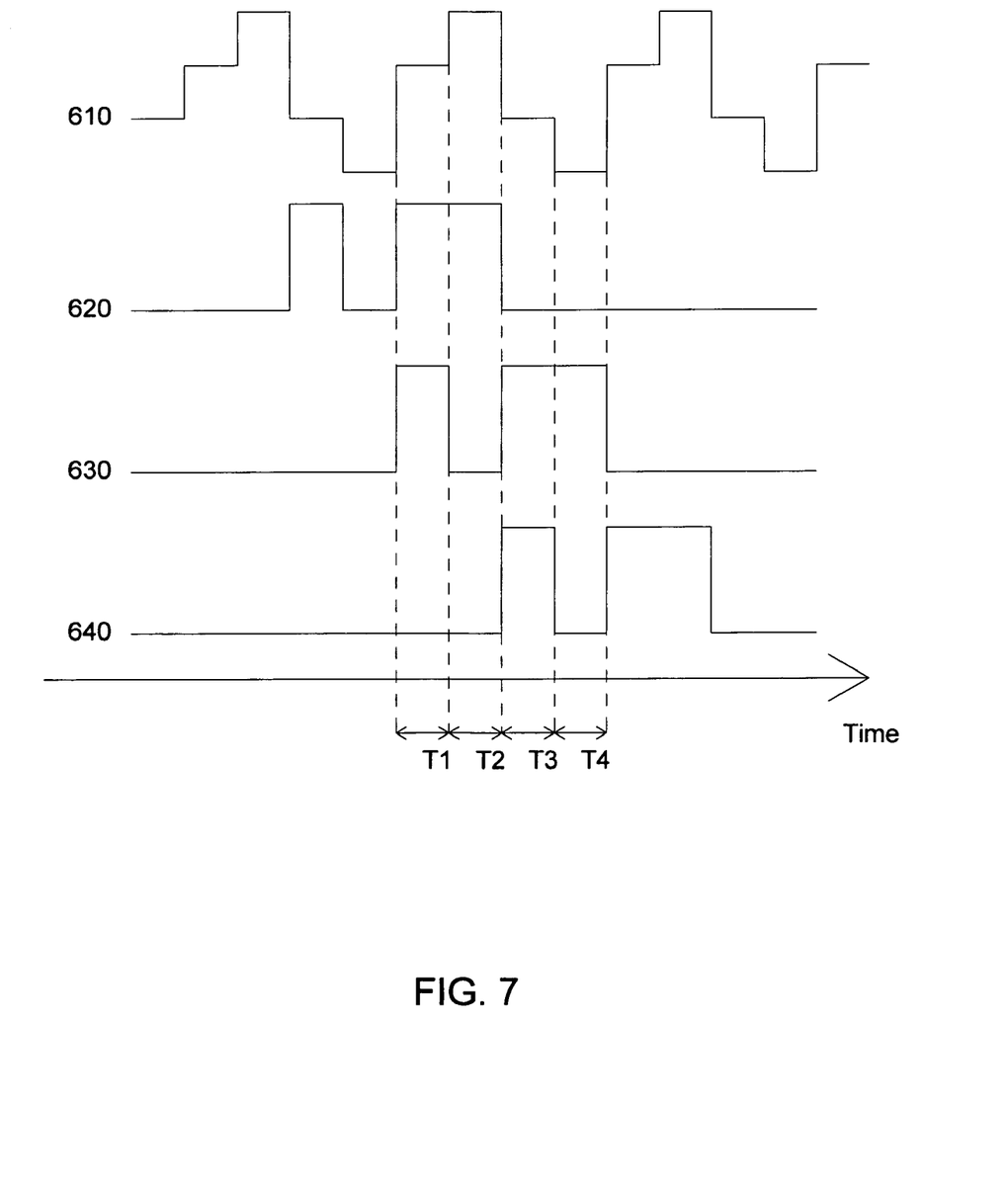
FIG. 7 shows an example of timing charts of scan signals and a pixel voltage from the scan lines and the data line of FIG. 5 according to an embodiment of the invention.

FIG. 7 shows an example of timing charts of the scan signals and the pixel voltage respectively output, in accordance with an inversion driving protocol (e.g., row inversion), from scan lines 511, 512 and 513 and data line 521 of FIG. 5. In FIG. 7, curve 610 corresponds to the inverting voltage level on data line 521; curve 620 corresponds to the voltage level of scan signal S1; curve 630 corresponds to the voltage level of scan signal S2; and curve 640 corresponds to the voltage level of scan signal S3.

The following refers to FIGS. 5 and 7 together. During scan period T1, scan signal S1 is at a high level such that transistors 530 and 541 turn on and scan signal S2 can be transmitted to transistor 551 of pixel 550 via transistor 530. During scan period T1, scan signal S2 is also at a high level such that transistor 551 turns on. After transistors 541 and 551 turn on, storage capacitors 542 and 552 can thus receive and store pixel voltage DA1 transmitted from data line 521. Thus, both storage capacitors 542 and 552 store pixel voltage DA1 transmitted from data line 521 during scan period T1.

During scan period T2, scan signal S1 is still at a high level such that transistors 530 and 541 turn on. Similarly, scan signal S2 can thus be transmitted to transistor 551 of pixel 550 via transistor 530. During scan period T2, however, scan signal S2 has transitioned to a low level such that transistor 551 turns off. Thus, transistor 551 turns off and transistor 541 turns on during scan period T2 such that storage capacitor 542 can receive pixel voltage DA2 transmitted from data line 521 and storage capacitor 552 cannot receive pixel voltage DA2.

Thus, storage capacitor 542 stores pixel voltage DA2 and storage capacitor 552 stores pixel voltage DA1 during scan period T2. Consequently, in accordance with one embodiment of the present invention, pixels 540 and 550 respectively store pixel voltage DA2 and pixel voltage DA1 respectively transmitted from data line 521 during scan period T1 and scan period T2 to display the corresponding luminance levels. Pixels 540 and 550 may retain this state for a desired period of time until, for example, the pixels are driven with different pixel voltage levels.

Similarly, data line 521 then transmits pixel voltages DA3 and DA4 to pixels 580 and 570 during scan periods T3 and T4, respectively. Pixels 570 and 580 are respectively a transmissive pixel and a reflective pixel in accordance with one embodiment of the present invention. Pixel voltages DA3 and DA4 are the reflective pixel voltage and the transmissive pixel voltage respectively output according to different V-R and V-T curves. In this particular example, pixel voltage levels DA3 and DA4 are driven in accordance with a row inversion driving technique. However, the invention is not limited to this driving technique.

Still referring to FIGS. 5 and 7, during scan period T3 scan signal S2 is at a high level such that transistor 560 and transistor 571 of pixel 570 turn on. Scan signal S3 transmitted from scan line 513 can thus be transmitted to transistor 581 of pixel 580 via transistor 560. During scan period T3, scan signal S3 is at the high level such that transistor 581 turns on. After transistors 571 and 581 turn on, both storage capacitors 572 and 582 receive and store pixel voltage DA3 transmitted from data line 521. Thus, both storage capacitors 572 and 582 store pixel voltage DA3 during scan period T3.

Thereafter, scan signal S2 is still at the high level during scan period T4 such that transistors 560 and 571 turn on. Scan signal S3 can thus be transmitted to transistor 581 via transistor 560. During scan period T4, however, scan signal S3 has transitioned to the low level such that transistor 581 turns off. Thus, transistor 571 turns on during scan period T4 such that storage capacitor 572 can receive pixel voltage DA4 transmitted from data line 521. Transistor 581 turns off such that storage capacitor 582 cannot receive pixel voltage DA4.

Therefore, storage capacitor 572 stores pixel voltage DA4 and storage capacitor 582 stores pixel voltage DA3 during scan period T4. Thus, pixels 570 and 580 respectively store pixel voltages DA4 and DA3 respectively transmitted from data line 521 during scan periods T3 and T4 to display the corresponding luminance levels.

In accordance with one embodiment of the present invention, the method of driving other pixels of the transflective LCD panel 500 is the same as that of driving pixels 540, 550, 570 and 580.

The advantages of the transflective LCD panel 500 having the single liquid crystal cell gap will be described by taking pixels 540 and 550 as an example. During two scan periods, on/off states of transistors 541 and 551 are controlled or driven according to transistor 530 and two scan signals outputted from scan lines 511 and 512 such that pixels 550 and 540 may respectively receive a reflective pixel voltage and a transmissive pixel voltage. Two scan lines 511 and 512 are shared with transmissive pixel 540 and reflective pixel 550 being positioned adjacent to each other.

In other words, in one embodiment of the invention scan line 512 is coupled to pixel 570 and pixel 550 and scan line 513 is coupled to an additional pixel (not numbered) and pixel 580. A first scan signal on scan line 512 may drive pixel 570 to a first pixel voltage DA1 from data line 521 during scan period T1. A third scan signal on scan line 512 may also drive pixel 570 to a second pixel voltage DA2 from data line 521 during a second scan period T2. Also, the first scan signal on scan line 512 and a second scan signal on scan line 513 may collectively drive pixel 580 to the first pixel voltage DA1 from data line 521 during the first scan period T1. In one embodiment of the invention, the first scan signal and third scan signal on the first scan line are continuous with one another in that they may seamlessly form a single pulse of equal amplitude. For example, as indicated above regarding FIG. 7, the scan signal on scan line 512 is "high" during time periods T3 and T4, thus forming a single pulse of substantially constant amplitude that continues through time periods T3 and T4.

Thus, in accordance with one embodiment of the present invention one transmissive pixel and one reflective pixel only has to use one scan line and one data line to receive the corrected average pixel voltage in the transflective LCD panel 500. Meanwhile, the transflective LCD panel 500 only has to use one scan driver and one data driver to drive the pixels without adding additional scan drivers and data drivers. Consequently, the area and the circuit complexity of the pixel driving circuit of the transflective LCD panel 500 can be greatly reduced and manufacturing costs can also be saved.

In transflective LCD panel 500 mentioned above, pixels 540 and 570 are transmissive pixels, and pixels 550 and 580 are reflective pixels. In practice, pixels 540 and 570 may also be reflective pixels, and pixels 550 and 580 may be transmissive pixels. Data line 521 may transmit the transmissive pixel voltage to transistors 541, 551, 571 and 581 during scan periods T1 and T3, and data line 521 may transmit the reflective pixel voltage to transistors 541 and 571 during scan periods T2 and T4.

However, when the reflective pixel and the transmissive pixel are requested to display the same luminance, the required reflective pixel voltage may be lower than the required transmissive pixel voltage. Thus, if pixels 550 and 580 are the reflective pixels and pixels 540 and 570 are the transmissive pixels, it may be more power-efficient to provide the reflective pixel voltage to all the transistors 541, 551, 571 and 581 during scan periods T1 and T3. By comparison, if pixels 550 and 580 are the transmissive pixels and pixels 540 and 570 are the reflective pixels, it may be less power-efficient to provide the transmissive pixel voltage to all the transistors 541, 551, 571 and 581 during scan periods T1 and T3.

Figure 8:
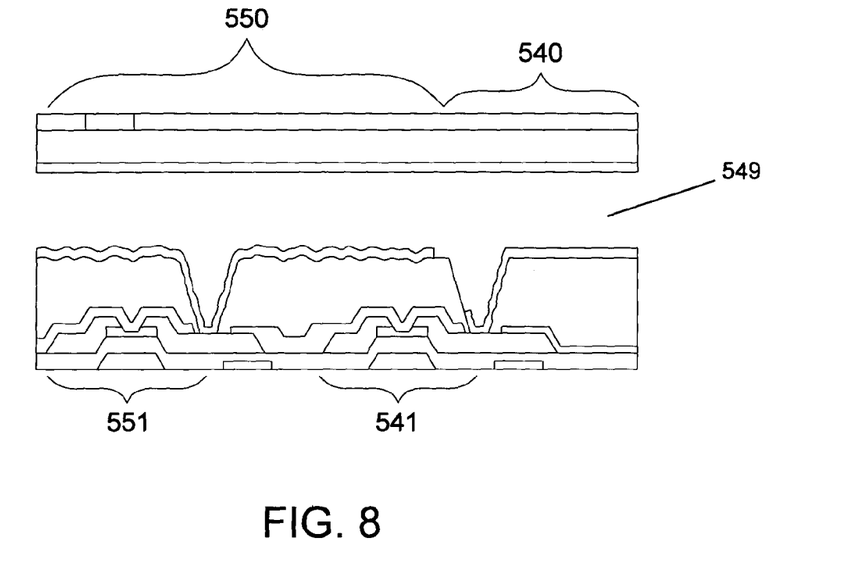
FIG. 8 is a cross-sectional view showing a transflective LCD panel of FIG. 5 according to an embodiment of the invention.

FIG. 8 is a cross-sectional view showing transflective LCD panel 500 of FIG. 5 taken along the direction A1-A2 in accordance with one embodiment of the present invention. As shown in FIG. 8, transflective LCD panel 500 has a single liquid crystal cell gap 549.

Figure 9:
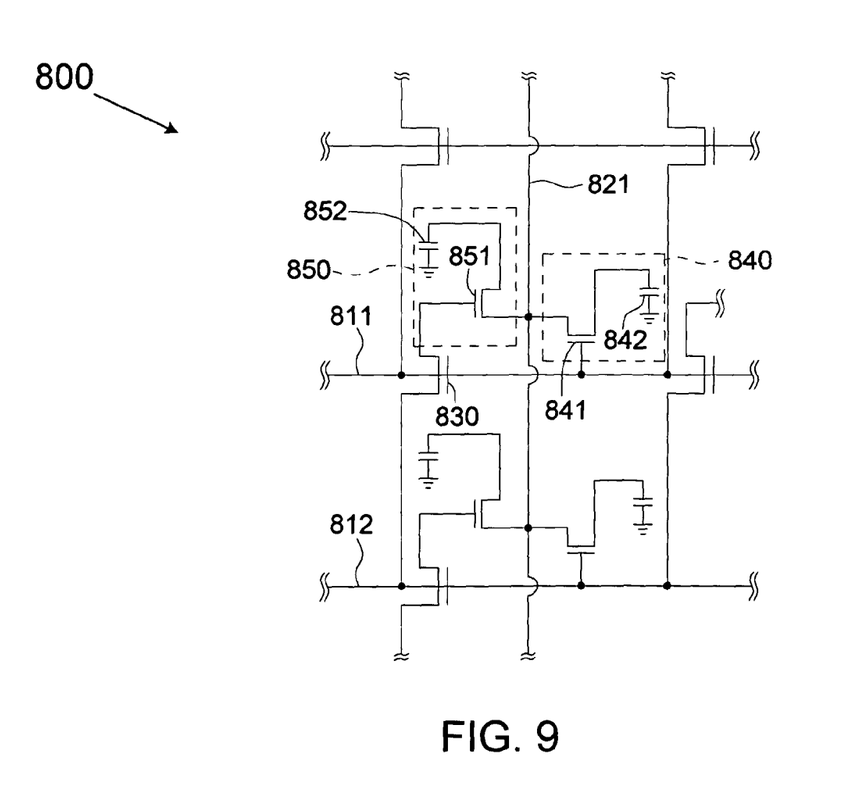
FIG. 9 is a schematic diagram of a portion of a pixel driving circuit according to an embodiment of the invention.

FIG. 9 is a diagram showing a portion of a pixel driving circuit in accordance with another embodiment of the present invention. Pixel 840 includes transistor 841 and storage capacitor 842. Pixel 850 includes transistor 851 and storage capacitor 852. In FIG. 9, pixels 840 and 850 are respectively the transmissive pixel and the reflective pixel, for example. Pixels 840 and 850 respectively receive pixel voltage DT2 and pixel voltage DT1 respectively transmitted from data line 821 during scan period TM1 and scan period TM2. Pixel voltages DT1 and DT2 are the reflective pixel voltage and the transmissive pixel voltage output according to V-R curves and V-T curves.

Scan lines 811 and 812 respectively transmit scan signals G1 and G2. Transistor 830 and transistor 841 of pixel 840 are controlled by scan signal G1. When transistor 830 turns on, scan signal G2 is transmitted to transistor 851 via transistor 830 to control transistor 851 of pixel 850 to turn on or not.

During scan period TM1, transistors 841 and 851 turn on such that both storage capacitors 842 and 852 store pixel voltage DT1. During scan period TM2, transistor 841 turns on such that storage capacitor 842 can receive pixel voltage DT2. However, transistor 851 turns off such that storage capacitor 852 cannot receive pixel voltage DT2. The operations of the circuit are similar to those of the transflective LCD panel of FIG. 5 in accordance with one embodiment of the present invention. As mentioned above, pixels 840 and 850 respectively store pixel voltage DT2 and pixel voltage DT1 transmitted from data line 821 during scan periods TM1 and TM2 to display the corresponding luminance levels.

Figure 10:
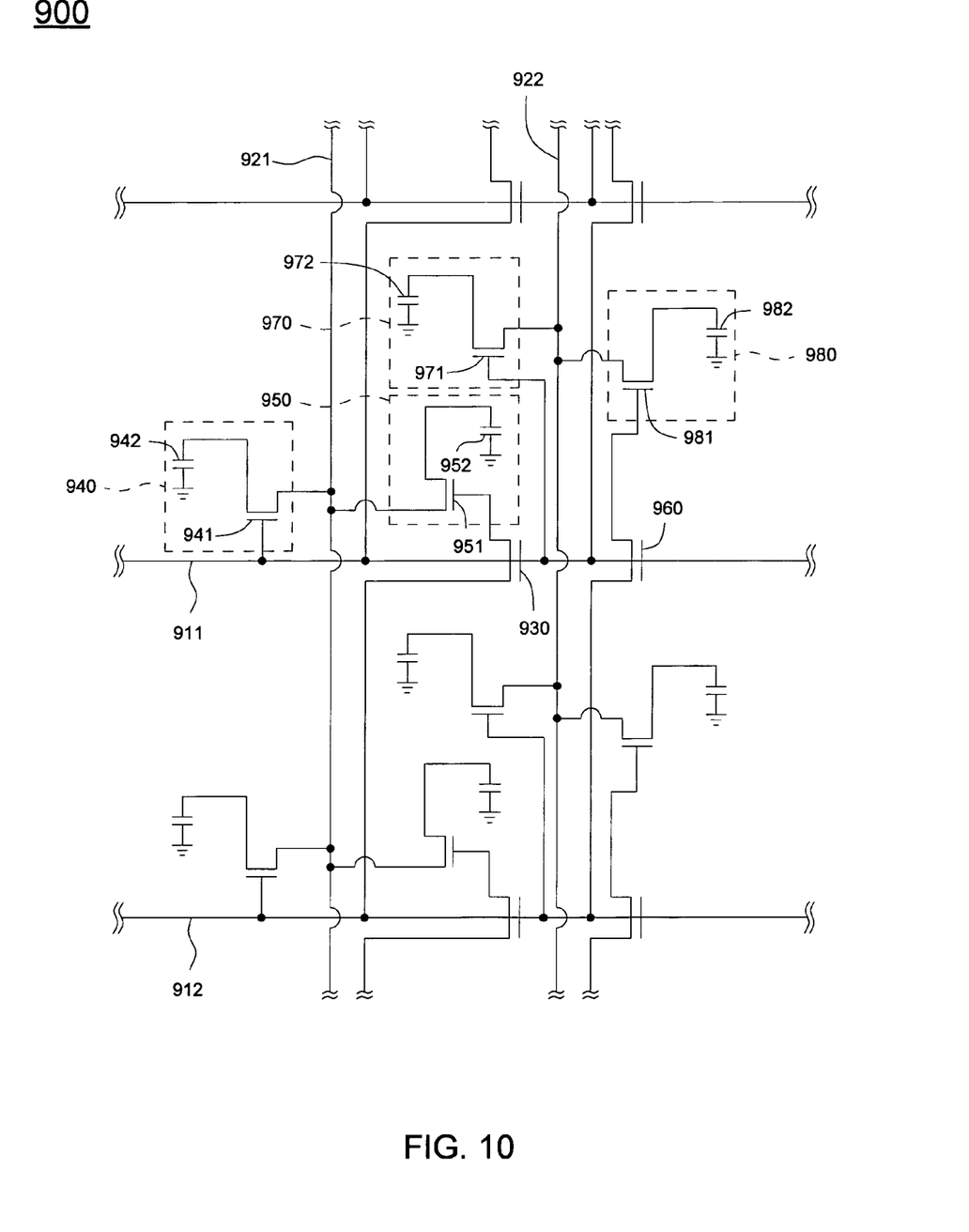
FIG. 10 is a schematic diagram of a portion of the pixel driving circuit according to the transflective LCD panel 900 according to an embodiment of the invention.

FIG. 10 is a diagram showing a portion of the pixel driving circuit according to transflective LCD panel 900 in accordance with one example of the present invention. Pixel 940 includes transistor 941 and storage capacitor 942. Pixel 950 includes transistor 951 and storage capacitor 952. Pixel 970 includes transistor 971 and storage capacitor 972. Pixel 980 includes transistor 981 and storage capacitor 982. In this example, pixels 940 and 950 are reflective pixels, and pixels 970 and 980 are transmissive pixels.

In accordance with one embodiment of the present invention, pixels 940 and 950 respectively receive pixel voltage P2 and pixel voltage P1 respectively transmitted from data line 921 during scan period K1 and scan period K2. Pixels 970 and 980 respectively receive pixel voltage P4 and pixel voltage P3 respectively transmitted from data line 922 during scan periods K1 and K2.

Pixel voltages P1 and P2 are the reflective pixel voltages outputted according to a first V-R curve. Pixel voltages P3 and P4 are the transmissive pixel voltages outputted according to a second V-T curve.

Scan lines 911 and 912 respectively transmit scan signals SN1 and SN2. Transistor 930, transistor 941 of pixel 940, transistor 960 and transistor 971 of pixel 970 are controlled by scan signal SN1. When transistor 930 turns on, scan signal SN2 is transmitted to transistor 951 via transistor 930 to control transistor 951 of pixel 950 to turn on or not. When transistor 960 turns on, scan signal SN2 is transmitted to transistor 981 via transistor 960 to control transistor 981 of pixel 980 to turn on or not.

Figure 11:
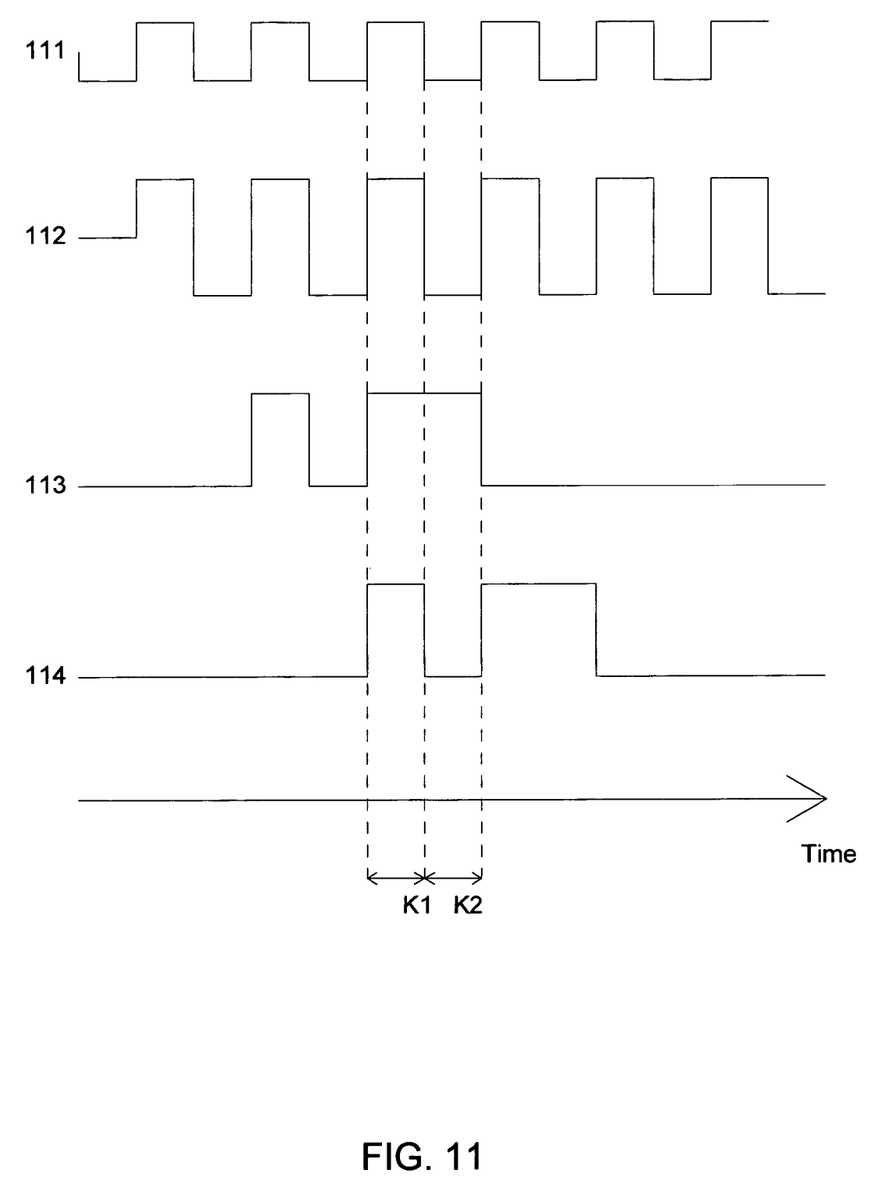
FIG. 11 shows an example of timing charts of scan signals and a pixel voltage outputted from the scan lines and the data lines of FIG. 10 according to an embodiment of the invention.

FIG. 11 shows an example of timing charts of the scan signals and the pixel voltage outputted from scan lines 911 and 912 and data lines 921 and 922 of FIG. 10. In FIG. 11, curve 111 corresponds to the voltage level on data line 921, curve 112 corresponds to the voltage level on data line 922, curve 113 corresponds to the voltage level of scan signal SN1, and curve 114 corresponds to the voltage level of scan signal SN2. The voltage level of curve 111 may be selected such that the voltage levels of curves 111 and 112 have the same polarity in accordance with one embodiment of the present invention or opposite polarities in alternative embodiments. In FIG. 11, the voltage levels of curves 111 and 112 have the same polarity.

The following refers to FIGS. 10 and 11 together. During scan period K1, scan signal SN1 has a high level such that transistors 930 and 941 turn on. Scan signal SN2 can thus be transmitted to transistor 951 of pixel 950 via transistor 930. During scan period K1, scan signal SN2 may also have a high level such that transistor 951 turns on. After transistors 941 and 951 turn on, storage capacitors 942 and 952 start to receive and store pixel voltage P1 transmitted from data line 921.

Meanwhile, in accordance with one embodiment of the present invention high-level scan signal SN1 may also make transistors 960 and 971 turn on during scan period K1. Scan signal SN2 can thus be transmitted to transistor 981 of pixel 980 via transistor 960. During scan period K1, high-level scan signal SN2 also makes transistor 981 turn on. After transistors 971 and 981 turn on, storage capacitors 972 and 982 can thus receive and store pixel voltage P3 transmitted from data line 922.

Thus, both storage capacitors 942 and 952 store pixel voltage P1 transmitted from data line 921 during scan period K1, and both storage capacitors 972 and 982 store pixel voltage P3 transmitted from data line 922.

Next, scan signal SN1 is still at the high level during scan period K2 such that transistors 930 and 941 turn on. Similarly, scan signal SN2 can thus be transmitted to transistor 951 of pixel 950 via transistor 930. During scan period K2, however, scan signal SN2 is at the low level to make transistor 951 turn off.

Meanwhile, high-level scan signal SN1 also makes transistors 960 and 971 turn on during scan period K2. Similarly, scan signal SN2 can thus be transmitted to transistor 981 of pixel 980 via transistor 960. At scan period K2, low-level scan signal SN2 also makes transistor 981 turn off.

Thus, transistors 941 and 971 turn on during scan period K2 such that storage capacitor 942 can receive pixel voltage P2 transmitted from data line 921, and storage capacitor 972 can receive pixel voltage P4 transmitted from data line 922. In addition, transistors 951 and 981 turn off so that storage capacitor 982 does not receive pixel voltage P2, and storage capacitor 952 does not receive pixel voltage P4.

Thus, storage capacitor 942 stores pixel voltage P2 and storage capacitor 952 stores pixel voltage P1 during scan period K2. Storage capacitor 972 stores pixel voltage P4, and storage capacitor 982 stores pixel voltage P3.

Therefore, reflective pixels 940 and 950 respectively store pixel voltages P2 and P1 respectively transmitted from data line 921 during scan period K1 and scan period K2 to display the corresponding luminance levels. Transmissive pixels 970 and 980 respectively store pixel voltages P4 and P3 transmitted from data line 922 during scan periods K1 and K2 to display the corresponding luminance levels.

The way of driving other pixels of the transflective LCD panel 900 is the same as that of driving pixels 940, 950, 970 and 980, so detailed descriptions thereof will be omitted.

Pixels 940 and 950 may be reflective pixels and pixels 970 and 980 may be transmissive pixels in accordance with one embodiment of the present invention. In practice, pixels 940 and 950 may also be the transmissive pixels and pixels 970 and 980 may also be reflective pixels.

In accordance with one embodiment of the present invention, a difference between transflective LCD panels 900 (FIG. 10) and 500 (FIG. 5) concerns, for example only, the positional relationships between the transmissive pixels and the reflective pixels. In transflective LCD panel 500, pixels 540 and 550 are substantially adjacent to one another and are respectively the transmissive pixel and the reflective pixel that receive the pixel voltages transmitted from the same data line. In transflective LCD panel 900, pixels 940 and 950 are reflective pixels that receive the pixel voltages transmitted from the data line 921. Also, pixels 940 and 950 are not adjacent. For example, pixels 940 and 950 are separated by data line 921. Thus, transflective LCD panel 900 has an enhanced image display quality due to, for example, its use of a staggered arrangement of transmissive pixels and reflective pixels. For example only, reflective pixel 940 is staggered from transmissive pixel 970.

Adopting transflective LCD panel 900 with the single liquid crystal cell gap may reduce the area and the complexity of the pixel driving circuit. Similar to transflective LCD panel 500, one transmissive pixel and one reflective pixel each only need one scan line and one data line to receive the correct average pixel voltage in the transflective LCD panel 900. Meanwhile, transflective LCD panel 900 may only need one scan driver and one data driver to drive the pixels without adding additional scan drivers and data drivers. Consequently, the area and circuit complexity of the pixel driving circuit of transflective LCD panel 900 are greatly reduced resulting in lower manufacturing costs.

Figure 12:
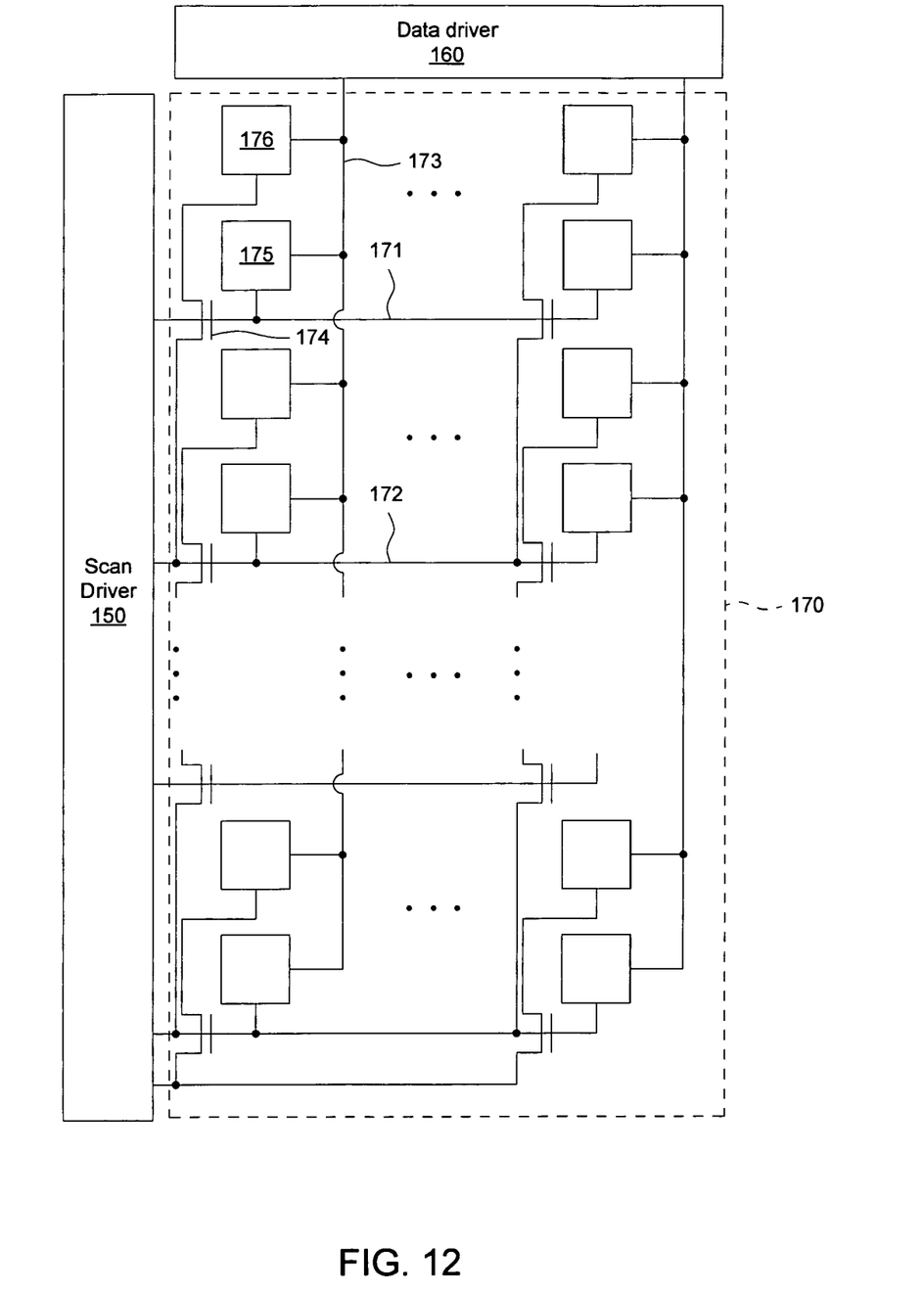
FIG. 12 is a schematic diagram of an LCD panel module according to an embodiment of the invention.

FIG. 12 shows an LCD panel module according to an embodiment of the invention. Referring to FIG. 12, the LCD panel module may include scan driver 150, data driver 160 and LCD panel 170, which is the same as or similar to the LCD panel of FIG. 4. LCD panel 170 may include scan lines 171 and 172, data line 173, transistor 174 and pixels 175 and 176. In this embodiment, the LCD panel module according to this embodiment of the invention will be described according to the method of driving pixels 175 and 176 in LCD panel 170.

Data driver 160 outputs pixel voltages V1 and V2 to data line 173 during scan period C1 and scan period C2, respectively. During scan period C1, scan driver 150 enables scan signals S1 and S2. Scan signals S1 and S2 are transmitted to transistor 174 and pixel 175 via scan lines 171 and 172, respectively, such that pixels 175 and 176 store pixel voltage V1. During scan period C2, the scan driver enables scan signal S1 and disables scan signal S2 such that pixel 175 receives pixel voltage V2 transmitted from data line 173, and pixel 176 cannot receive pixel voltage V2. Pixels 175 and 176 respectively store pixel voltages V2 and V1 transmitted from data line 173 during scan periods C1 and C2 to display the corresponding luminance levels. The driving method of pixels 175 and 176 during scan periods C1 and C2 is the same as that of pixels 432 and 433 of FIG. 4 in accordance with one embodiment of the present invention.

Every two pixels in the LCD panel according to an embodiment of the invention are controlled to be enabled or not through one transistor and two scan signals in two scan periods such that two pixel voltages transmitted from the same data line are received. In an LCD panel according to an embodiment of the invention, two pixels only need one data line and one scan line to receive the two pixel voltages transmitted from the data line to obtain an average voltage. Thus, when the LCD panel according to the embodiment of the invention is applied to the transflective LCD panel, the numbers of the scan drivers and the data drivers, and the numbers of the scan lines and the data lines may be reduced.

Thus, as mentioned above the manufacturing processes for an LCD panel with a single liquid crystal cell gap are simpler than those for an LCD panel with a dual liquid crystal cell gap, and the process variations also can be controlled more easily. However, the LCD panel according to the various embodiments of the invention may be more easily manufactured and have a less complex pixel driving circuit than associated with conventional dual liquid crystal cell groups.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) panel comprising:
a plurality of pixels including a first pixel, a second pixel, a third pixel, and a fourth pixel;
a plurality of scan lines including a first scan line coupled to the first pixel and the second pixel and a second scan line coupled to the third pixel and the fourth pixel, and
a plurality of data lines including a first data line;
wherein (i) a first scan signal on the first scan line is to drive the first pixel to a first pixel voltage of a first polarity from the first data line during a first scan period, (ii) a third scan signal on the first scan line is to drive the first pixel to a second pixel voltage of the first polarity from the first data line during a second scan period, and (iii) the first scan signal on the first scan line and a second scan signal on the second scan line are to collectively drive the fourth pixel to the first pixel voltage from the first data line during the first scan period.

2. The apparatus of claim 1, wherein the LCD panel includes a single liquid crystal cell gap.

3. The apparatus of claim 2, wherein the first pixel includes a transmissive pixel, the second pixel includes a reflective pixel, the third pixel includes a transmissive pixel, and the fourth pixel includes a reflective pixel.

4. The apparatus of claim 1, wherein a first pixel unit includes the first pixel and the fourth pixel, the first pixel including a transmissive pixel and the fourth pixel including a reflective pixel.

5. The apparatus of claim 1, further comprising a first transistor coupled to the first scan line, the second scan line, and the fourth pixel; wherein the first scan line couples to a control node of the first transistor, the second scan line couples to a first additional node of the first transistor, and the fourth pixel couples to a second additional node of the first transistor, the second scan signal on the second scan line to control the fourth pixel when the first scan signal enables the first transistor.

6. The apparatus of claim 1, wherein the first pixel voltage is less than the second pixel voltage.

7. The apparatus of claim 1, wherein the first pixel is not directly adjacent to the second pixel.

8. The apparatus of claim 1, wherein the first scan line and the second scan line are each coupled to a first scan driver but not a second scan driver and the first data line is coupled to a first data driver but not a second data driver.

9. The apparatus of claim 1, wherein:
the second scan signal on the second scan line is to drive the third pixel to the first pixel voltage from the first data line during the first scan period;
a fourth scan signal on the second scan line is to drive the third pixel to a third pixel voltage from the first data line during a third scan period; and
a fifth scan signal on the second scan line is to drive the third pixel to a fourth pixel voltage from the first data line during a fourth scan period.

10. The apparatus of claim 1, wherein the third scan signal on the first scan line is continuous with and of equal amplitude to the first scan signal on the first scan line.

11. A method including:
driving, via a first scan line with a single scan driver, a first pixel to a first pixel voltage of a first polarity during a first scan period and to a second pixel voltage of the first polarity during a second scan period, a third pixel to a third pixel voltage during a third scan period and to a fourth pixel voltage during a fourth scan period;

driving, via the first scan line and a second scan line with the single scan driver, a second pixel to the first pixel voltage during the first scan period, a fourth pixel to the third pixel voltage during the third scan period;

supplying the first pixel voltage and the second pixel voltage with a single data driver;

receiving the first pixel voltage and the second pixel voltage from a first data line;

wherein the first pixel voltage is not equal to the second pixel voltage, and the first pixel and the second pixel are each reflective pixels and the third pixel and the fourth pixel are each transmissive pixels.

12. The method of claim 11, further comprising:

maintaining a first scan signal on the first scan line during both the first and second scan period; and activating a second scan signal on the second scan line during the first scan period but deactivating the second scan signal during the second scan period.

13. The method of claim 11, further comprising receiving the third pixel voltage and the fourth pixel voltage from a second data line.

* * * * *